T. O. ORGAN.
GREASE CUP.
APPLICATION FILED AUG. 6, 1914.
1,156,804.
Patented Oct. 12, 1915.
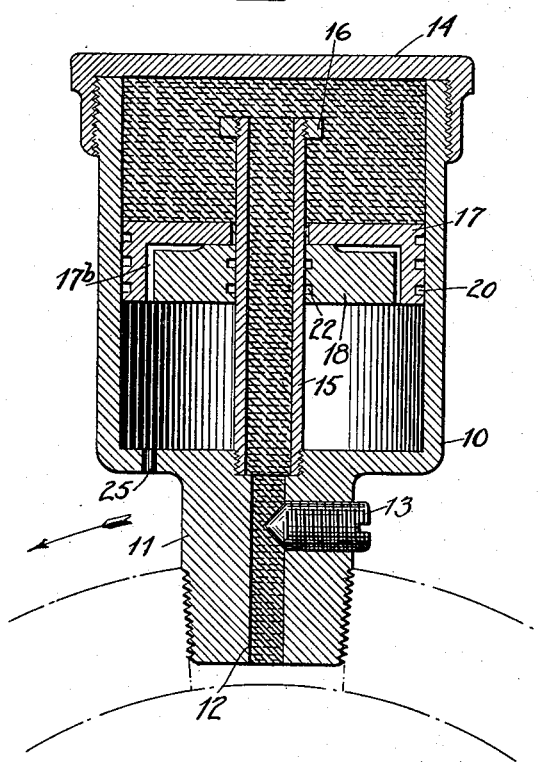
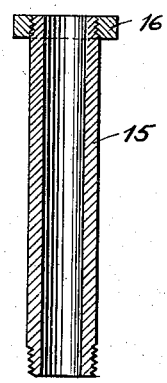
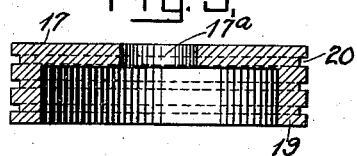
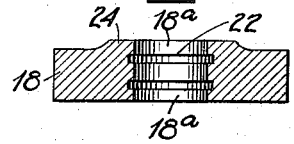
WITNESSES
Chas. H. Leibman
J. L. McAuliff
INVENTOR
Thomas O. Organ
BY Munn & Co
ATTORNEYS

UNITED STATES PATENT OFFICE.

THOMAS OPIE ORGAN, OF PHILADELPHIA, PENNSYLVANIA.

GREASE-CUP.

1,156,804. Specification of Letters Patent. Patented Oct. 12, 1915.

Application filed August 6, 1914. Serial No. 855,405.

*To all whom it may concern:*

Be it known that I, THOMAS OPIE ORGAN, a citizen of the United States, and a resident of Germantown, Philadelphia, in the county of Philadelphia and State of Pennsylvania, have invented a new and Improved Grease-Cup, of which the following is a full, clear, and exact description.

The present invention is intended more particularly for embodiment in centrifugal grease cups, although not limited strictly thereto.

The invention relates to that type of grease cup in which a piston is slidable in the cup longitudinally of the feed tube, to force the grease through said tube.

In grease cups of the character referred to, there is a liability of the piston binding on the feed tube or against the wall of the cup, by becoming tilted.

The prime object of the invention is to insure a parallel movement of the piston.

In carrying out the invention I form the piston in two members separately movable so that one may move relatively to the other. The one member is in grease-tight contact with the wall of the cup, while the other is in grease-tight contact with the feed tube, the two members being in contact with each other.

The invention will be particularly explained in the specific description following.

Reference is to be had to the accompanying drawings forming a part of this specification, in which similar characters of reference indicate corresponding parts in all the views.

Figure 1 is a central vertical section of a grease cup and piston embodying my invention; Fig. 2 is a central vertical section of the feed tube detached; and Figs. 3 and 4 represent central vertical sections of the respective members of the piston.

In embodying my invention in a grease cup the body 10 may be in the usual form, having a threaded stem 11, to take into the machine element to be lubricated, the said stem having a feed bore 12 which may be controlled by an intruding transverse screw 13. The cup is provided with a suitable closure 14, here shown as a screw cap. The center feed tube 15 rises in the interior of the cup from the bottom thereof, and leads to the feed bore 12. The upper end of the tube has any suitable stop to limit the movement of the piston, said stop being here shown as in the form of a ring nut 16.

Instead of employing a unitary piston, which is liable to tilt and bind, I provide a two-part piston composed of disks 17, 18. The forward disk 17 is formed with a rearwardly extending peripheral flange 19, thereby producing a recess $17^b$, which receives the rear disk 18. The two disks, 17, 18, are fitted to move longitudinally of the feed tube 15, being formed respectively with central bores $17^a$, $18^a$.

The disk 17 and its flange 19 have a grease-tight sliding fit against the wall of the cup, and preferably have annular grooves 20 in the periphery, in which grease will accumulate and act as a packing should any grease find entrance between the piston and the wall of the cup. The other member 18 of the piston is loose at its periphery, being spaced from the flange 19 of disk 17, but the bore $18^a$ of said member 18 is given a grease-tight sliding fit on the feed tube 15. Preferably the bore $18^a$ is formed with annular grooves 22 for a purpose similar to that of the grooves 20.

The two piston members 17, 18, are in contact with each other, the member 18 having a boss 24 surrounding the bore thereof, which is in contact with the rear side of the disk 17, so that the two members of the piston may have a limited sliding contact in shifting relatively to each other, in the event one should tend to tilt.

It is to be observed that the bore $17^a$ of the disk 17 is of greater diameter than the bore $18^a$, so that the disk 17 is loose and capable of tilting relatively to the tube, whereas the contracted bore $18^a$ serves to prevent the escape of grease along the tube.

In the form shown, centrifugal force may be relied upon to carry the piston outwardly on the feed tube, and as each piston member is independently under the influence of the centrifugal force, the one may be relied upon to correct any tendency of the other member to tilt. A force other than centrifugal force may be utilized to carry the piston outward, as will be readily understood by those skilled in the art. For instance, fluid pressure may be exerted on the piston, the fluid being entered through an orifice 25. Said orifice 25, when centrifugal force is relied upon, will serve as a vent.

Having thus described my invention, I claim as new and desire to secure by Letters Patent:

1. In a grease cup, a cup body having a feed bore, a closure therefor, a tube rising in the cup and leading to the feed bore, and a piston comprising separate front and rear members independently movable in the cup, the feed tube extending through said piston, the one member of the piston loosely embracing the tube and having a grease-tight fit at its periphery against the wall of the cup body, and the other member having a grease-tight fit on the tube and free at its periphery.

2. In a grease cup, a cup body having a feed outlet, an inner tube in register with the feed outlet, and a piston movable in the cup along said feed tube, said piston comprising independently movable juxtaposed rigid disks in contact with each other adjacent to the bores thereof, and spaced from each other outward from the contacting surfaces, to permit a tilting of one rigid disk relatively to the other.

3. In a grease cup, a cup body having a feed outlet, a central feed tube leading to the feed outlet, and a piston in said cup, the piston comprising a disk provided with a peripheral flange in grease-tight contact with the wall of the cup body, and a second disk within the flange of the first disk and in grease-tight contact with the feed tube, the said disks being in contact at their opposed faces and relatively movable whereby any tendency of either one to tilt will be corrected by the other.

4. In a grease cup, a cup body having a feed outlet, an inner feed tube leading to the feed outlet, and a piston slidable on the feed tube, said piston comprising two disks contacting with each other adjacent to the feed tube, the one disk having a grease-tight contact with the wall of the cup body and the other having a grease-tight contact with the feed tube, the said disks being in contact at their opposed faces and relatively movable whereby any tendency of either one to tilt will be corrected by the other.

5. A piston for grease cups having a center feed tube, said piston comprising two disks having bores to receive the feed tube of the grease cup, one disk having an annularly grooved periphery for contact with the wall of a grease cup, and the other disk having an annularly grooved bore, the wall of which is adapted for contact with the feed tube of a grease cup, the said disks being in contact at their opposed faces and relatively movable whereby any tendency of either one to tilt will be corrected by the other.

6. A piston for grease cups having a central feed tube, said piston comprising two disks having bores to receive the feed tube of a grease cup, one disk having a periphery adapted to have a grease-tight fit against the wall of a grease cup and the other disk having a bore adapted to have a grease-tight fit against the feed tube and being free at its periphery from the first disk, the bore of the first mentioned disk being larger than the bore of the second mentioned disk.

In testimony whereof I have signed my name to this specification in the presence of two subscribing witnesses.

THOMAS OPIE ORGAN.

Witnesses:
 FRANK WARD,
 MOSES W. FRANKEL.

Copies of this patent may be obtained for five cents each, by addressing the "Commissioner of Patents, Washington, D. C."